United States Patent [19]
Izumi

[11] 4,086,523
[45] Apr. 25, 1978

[54] RECHARGEABLE BATTERY

[75] Inventor: Koji Izumi, Nagano, Japan

[73] Assignee: Izumi Products Company, Elk Grove Village, Ill.

[21] Appl. No.: 760,117

[22] Filed: Jan. 17, 1977

[51] Int. Cl.² .......................................... H01M 10/46
[52] U.S. Cl. ........................................ 320/2; 339/34; 429/7
[58] Field of Search ................. 320/2, 3, 4, 5; 339/34; 429/7

[56] References Cited

U.S. PATENT DOCUMENTS

| | | | |
|---|---|---|---|
| 2,876,410 | 3/1959 | Fry | 320/48 |
| 2,995,695 | 8/1961 | Reich | 320/2 |
| 3,013,198 | 12/1961 | Witte et al. | 320/2 |
| 3,028,535 | 4/1962 | McCarthy | 320/2 |
| 3,028,536 | 4/1962 | Bilsky | 320/2 |
| 3,067,373 | 12/1962 | Hopt et al. | 320/2 |
| 3,089,072 | 5/1963 | Jephcott | 320/2 |
| 3,109,132 | 10/1963 | Witte | 320/53 |
| 3,120,632 | 2/1964 | Hopt et al. | 320/2 |
| 3,194,689 | 7/1965 | Deschamps | 307/150 |
| 3,220,888 | 11/1965 | Moore et al. | 429/1 |
| 3,296,514 | 1/1967 | Pearson | 320/5 |
| 3,320,508 | 5/1967 | Bradshaw et al. | 320/2 |
| 3,360,708 | 12/1967 | Palmer-Persen | 320/2 |
| 3,458,794 | 7/1969 | Bohnstedt et al. | 320/2 |
| 3,519,914 | 7/1970 | Fujimaki et al. | 320/2 |
| 3,533,119 | 10/1970 | Dokos | 15/22 |
| 3,665,285 | 5/1972 | Mullersman et al. | 320/2 |

*Primary Examiner*—Robert J. Hickey
*Attorney, Agent, or Firm*—Wegner, Stellman, McCord, Wiles & Wood

[57] ABSTRACT

A rechargeable battery including a storage cell, a housing enclosing the storage cell, a rectifier in the housing, and a pair of output terminals exposed for delivering electrical energy from the storage cell. The battery is provided with a pair of prongs arranged for electrical connection to a female power supply receptacle. The prongs are pivotally mounted at opposite sides of one of the terminals to extend selectively in a first disposition straddling one end of the housing, and a second disposition projecting from that one end in parallel spaced relationship to be received in the female power receptacle. The electrical circuit of the rechargeable battery includes a switch for electrically connecting the prongs to the rectifier and storage cell to permit recharging of the storage cell from the female power supply receptacle only when the prongs are disposed in the extended disposition. The prongs may be biased both to the retracted disposition and the extended disposition, and at least one of the contacts may be a spring contact for effectively maintaining electrical connection between the prongs and the charging circuitry. One of the contacts of the switches may be defined by a portion of the prongs.

12 Claims, 6 Drawing Figures

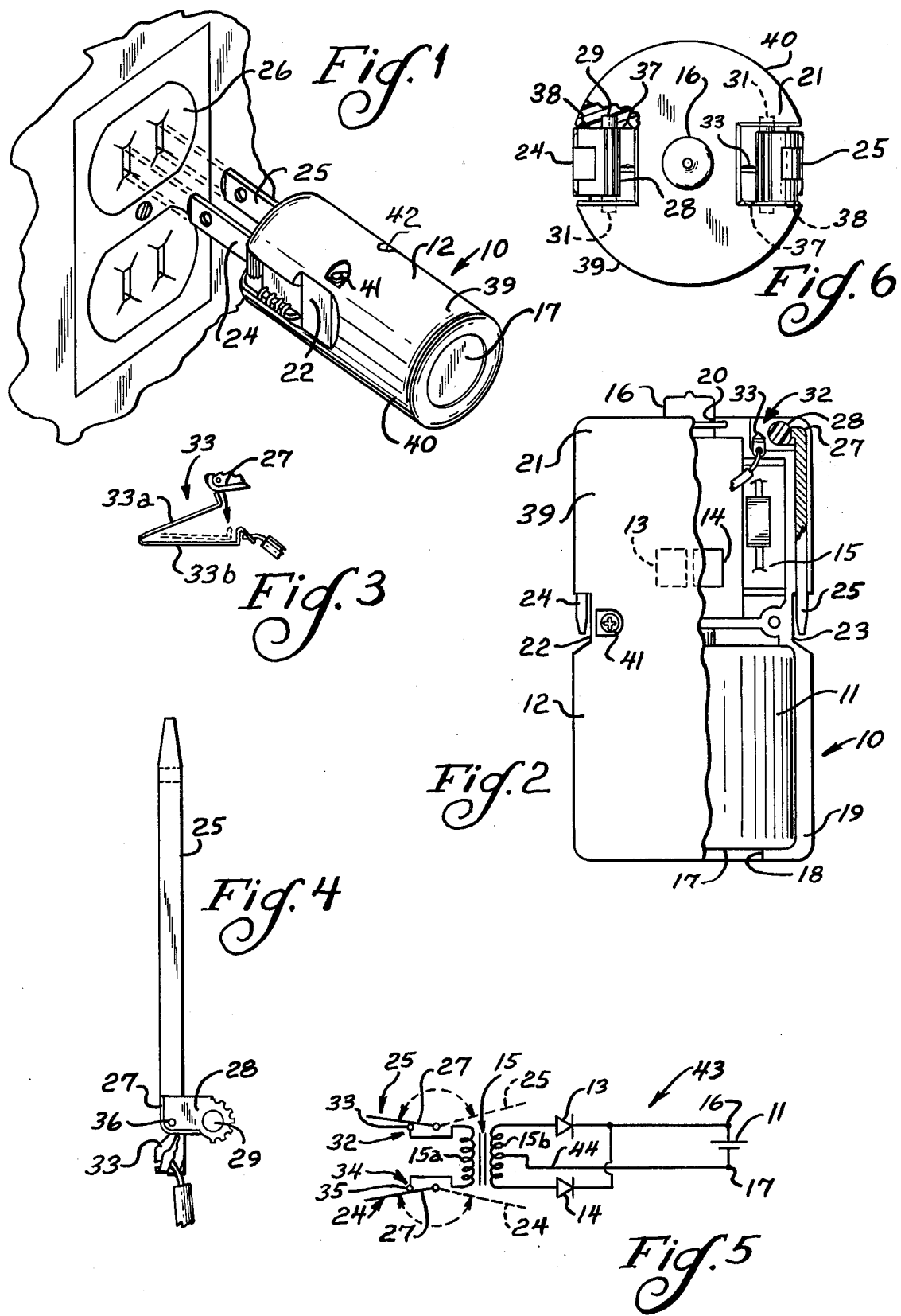

RECHARGEABLE BATTERY

BACKGROUND OF THE INVENTION

1. Field of the Invention

This invention relates to rechargeable batteries and in particular to rechargeable batteries having integrally associated recharging circuitry.

2. Description of the Prior Art

In U.S. Pat. No. 2,876,410, of Donald R. Fry, a rechargeable battery capsule is disclosed having an end piece enclosing a pair of recharging prongs adapted to fit a conventional wall power supply outlet. The capsule includes a pair of sealed nickel-cadmium cells and a lamp, and is adapted to be disposed within a conventional flashlight housing.

Robert W. Reich, in U.S. Pat. No. 2,995,695, shows a rechargeable battery having a number of different prong arrangements. Reich also teaches the use of end caps for enclosing the prongs in such batteries and includes, in one embodiment, prongs extending outwardly from the side of the outer shell which may be folded into recesses in the shell side.

In U.S. Pat. No. 3,028,535, of R. J. McCarthy, a rechargeable electric battery is shown having means for preventing exposure of live portions thereof by a user gripping the battery unit when it is plugged in and connected to or removed from an electrical power supply circuit.

H. W. Bilsky, in U.S. Pat. No. 3,028,536, shows a rechargeable electric battery having a movable end wall for selectively exposing the prongs utilized in recharging the battery.

Waldemar Witte et al, in U.S. Pat. No. 3,013,198, shows a cell unit wherein prongs for recharging the battery are disposed at an end of the unit opposite the end provided with the battery output terminal. The prongs are retractable into the housing and include pushbuttons for closing switches connecting the battery terminals to the storage cell. A gripping member is provided for manipulation to move the prongs inwardly and outwardly through sleeves mounted in the outer housing.

In U.S. Pat. No. 3,067,373, of Rudolf Hopt et al, a power-unit assembly consisting of a power unit and a load unit which are mechanically interconnected to form a compact portable assembly. The power unit contains a rechargeable battery cell.

John Anthony Jephcott, in U.S. Pat. No. 3,089,072, shows a rechargeable battery unit having a removable cap member adapted to fit on or be otherwise secured to both ends of the battery casing and serving, when it is fitted on one end, to isolate a first output terminal from the exterior of the battery and, when fitted on the other end, provide a connection between another output terminal and the exterior of the cap member.

Waldemar Witte, in U.S. Pat. No. 3,109,132, shows a miniature battery charging circuit wherein charging prongs are covered by a removable cap.

Rudolf Hopt et al, in U.S. Pat. No. 3,120,632, show a power unit-load unit assembly having a removable cap-type load unit with prongs provided on a power unit.

In U.S. Pat. No. 3,194,689, of Robert M. Deschamps, an electrical device is shown having a power supply provided with attachment prongs or pins for selective electrical engagement with an electrically operable instrument or apparatus carried in a separable casing.

William C. Morre et al, in U.S. Pat. No. 3,220,888, show a rechargeable battery pack having terminals both at the ends and sides of the housing.

In U.S. Pat. No. 3,296,514, Harry A. Pearson shows a rechargeable battery unit wherein prongs are provided which are received within a cap in one form, and which are projectable through a pair of openings in another form of cap in another form of unit.

Franklin C. Bradshaw et al, in U.S. Pat. No. 3,320,508, show a battery and charging circuit cartridge utilizing a pair of cells with prongs attached to the cartridge and normally covered by a protective cap.

David Palmer-Persen, in U.S. Pat. No. 3,360,708, shows a combination battery and recharger comprising separable units.

In U.S. Pat. No. 3,458,794, of Charles E. Bohnstedt, et al, a rechargeable device is shown having a battery operated unit retained within a housing.

Takayuki Fujimaki et al, in U.S. Pat. No. 3,519,914, show a hinged cover having prongs mounted thereto which are disposable in a pair of slots in the side of the cover in a retracted position of the prongs.

Sophocles J. Dokos, in U.S. Pat. No. 3,533,119, shows a cordless portable electric appliance having a separable rechargeable power supply having exposed prongs.

In U.S. Pat. No. 3,665,285, of Ferdinand H. Mullersman et al, a polarity-mated rechargeable battery and charging unit is shown having a plurality of casings for enclosing the battery pack and battery charger, respectively.

Thus, the prior art shows a substantial number of different forms of rechargeable battery devices wherein prongs are provided for connection of the device to a conventional female power supply receptacle with means incorporated in the device for rectifying the alternating current from the power supply to recharge the storage cell within the device. Different means have been provided in the art for covering or retracting the prongs utilized to effect the connection of the device to the alternating current power supply receptacle.

SUMMARY OF THE INVENTION

The present invention comprehends an improved rechargeable battery device having improved prong means. More specifically, the present invention comprehends such a rechargeable battery having cell means for storing electrical energy, housing means enclosing the cell means, rectifier means within the housing means, and a pair of output terminals exposed to outwardly of the housing for delivering electrical energy from the cell means.

The pair of prongs arranged for electrical connection to female power supply receptacles are movably mounted at opposite sides of one of the terminals to extend selectively in a first disposition straddling one end of the housing, and in a second disposition projecting from the end of the housing in parallel spaced relationship to be received in the female power receptacle with the terminal between the prongs effectively shielded from inadvertent contact. Circuit means are provided for selectively interconnecting the cell means, rectifier means, terminals, and prongs, and include switch means for electrically connecting the prongs to the rectifier means and cell means to permit recharging of the cell means from the female power supply receptacle only when said prongs are disposed in said second disposition.

The switch means may include first contact means carried by the housing and connected to the circuit means, and second contact means electrically connected to the prongs for current conductive engagement with the first contact means when the prongs are in the second disposition.

Spring means may be provided for biasing the prongs selectively to each of the first and second dispositions.

In the illustrated embodiment, the mounting means pivotally mount the prongs to the housing.

In the illustrated embodiment, at least one of the contact means comprises spring leaf means for resiliently maintaining the electrical contact when the prong means are in the second extended disposition.

The first contact means may comprise a portion of the prongs which is brought into electrical conductive engagement with the second contact means as an incident of disposition of the prongs in the extended disposition.

The housing may define shoulder means for limiting the pivotal movement of the prongs accurately to the extended disposition for facilitated alignment with the female power supply receptacle.

Thus, the rechargeable battery device of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a rechargeable battery embodying the invention illustrating the connection thereof to a conventional female power supply receptacle for recharging the storage cell thereof;

FIG. 2 is a side elevation with portions broken away to facilitate illustration of different components of the rechargeable battery;

FIG. 3 is a side elevation of one of the contact means;

FIG. 4 is a side elevation of one of the prongs illustrating the electrical connection of the first and second contact means when the prong is in the extended disposition;

FIG. 5 is a schematic electrical wiring diagram of the control circuitry of the rechargeable battery; and FIG. 6 is a top plan view of the battery device.

DESCRIPTION OF THE PREFERRED EMBODIMENT

In the exemplary embodiment of the invention as disclosed in the drawing, a rechargeable battery generally designated 10 is shown to comprise a storage cell 11 for storing electrical energy. The storage cell is received within an outer housing 12. Also received within the housing is a pair of rectifiers 13 and 14 and voltage dropping transformer 15. The transformer may include a primary winding 15a and a low voltage secondary winding 15b for providing a suitable low voltage for recharging the storage cell 11 through the rectifiers 13 and 14.

The battery 10 is further provided with output terminals 16 and 17 at opposite ends of the housing 12. In the illustrated embodiment, the housing is formed of a dielectric material, such as molded synthetic resin. Terminal 17 may comprise one end of the storage cell 11, as illustrated in FIG. 2, which is exposed through a suitable opening 18 in one end 19 of the housing. Terminal 16 may be exposed through a suitable opening 20 in the other end 21 of the housing.

As illustrated in FIGS. 1 and 2, the housing further defines a pair of side recesses 22 and 23 for respectively receiving a pair of prongs 24 and 25 adapted to have electrical connection with a conventional female power supply receptacle, such as wall-mounted receptacle 26, as shown in FIG. 1. More specifically, the prongs are selectively disposable in an extended arrangement, as shown in FIG. 1, for reception in the female receptacle 26, or in a retracted disposition as shown in FIG. 2 wherein they are effectively retracted into the recesses 22 and 23, respectively, and thereby straddling the housing end 21.

In the illustrated embodiment, each prong is formed of a conductive material, such as metal, and illustratively, may be formed of steel. As shown in FIG. 4, the prong may define an inner end 27, which is connected to a pivot 28 which may be formed of molded synthetic resin. Pivot pins 29 may project outwardly from opposite sides of the pivot portion 28 and are pivotally received in the housing 21 for mounting the prongs pivotally thereto. A suitable coil spring 31 may be provided in association with each of the pivots 28 for biasing the prongs to the retracted position of FIG. 2.

As shown in FIG. 2, end 27 of prong 25 defines a turned portion comprising a moving contact of a switch generally designated 32. A fixed contact 33 is mounted in the housing adjacent pivots 28 of the prong so as to be selectively engaged by the moving contact 27 when the prong is pivoted to the extended position, as shown in FIG. 4. Fixed contact 33 comprises a leaf spring contact having a pair of yieldably connected portions 33a and 33b providing a positive electrical connection between contact 27 and contact 33 in the arrangement of FIG. 4. End 27 of prong 24 similarly defines a moving contact of a switch 34 for selective engagement with a fixed contact 35 adjacent the pivot 28 of the prong 24.

Each pivot 28 is provided with a projecting boss 36 which is selectively receivable in a pair of recesses 37 and 38 by the action of the coil spring 31 so as to bias the prongs into either of the extended or retracted positions when the prongs are moved substantially thereto. Thus, to move the prong from either of the two extreme positions, the user must forcibly pivot the prong so as to urge the boss 36 outwardly from the selected recess against the action of the coil spring 31 and permit the prong then to be pivoted to the other extreme disposition. In the illustrated embodiment, the housing 12 is made up of two semicylindrical housing halves 39 and 40 secured together by suitable screws 41 and 42. Thus, the pivots may be secured in place between the housing portions prior to the secured assembly of the battery by the screws 41 and 42.

Referring now to FIG. 5, the circuitry, generally designated 43, of the battery provides a facilitated selective charging and operating arrangement of the battery by a simple manipulation of the prongs 24 and 25. As shown in FIG. 5, the prongs, when in the extended disposition, have electrical contact with the fixed contacts 33 and 35 which, in turn, are connected to the opposite ends of the transformer primary winding 15a. One end of the transformer secondary winding 15b is connected through rectifier 13 to terminal 16 of storage cell 11 and a center tap 44 is connected from the transformer secondary 15b to the terminal 17 of storage cell 11. The other end of the transformer secondary 15b is connected through rectifier 14 to storage cell terminal 16 to complete the wiring of the battery device 10.

Thus, when the prongs 24 and 25 are pivoted to the extended disposition of FIG. 1 and are inserted into a female power supply receptacle, such as receptacle 26, as shown in FIG. 1, alternating current is provided to the primary winding 15a of transformer 15. The transformer reduces the voltage suitably to provide a charging voltage to storage cell 11 through the rectifiers 13 and 14 which provide a full wave rectification of the alternating current power supply for improved rapid recharging of the storage cell.

Upon completion of the recharging operation, the user merely withdraws the battery device 10 from the power supply receptacle 26 and folds the prongs 24 and 25 to the retracted position of FIG. 2 whereupon the connection of the prongs to the transformer 15 is broken. The battery is now arranged in the form of a conventional battery configuration, as shown in FIG. 2, and may be utilized in conventional battery applications with the electrical terminals 16 and 17 being disposed as in conventional batteries at the opposite ends of the housing for conventional battery use. During such use, the rectifiers 13 and 14 prevent reverse flow of current from the battery through the transformer 15 without the need for further switching means in the device.

The rechargeable battery device of the present invention is extremely simple and economical of construction while yet providing an improved facilitated selective configuration of the battery for facilitated recharging and use operations. In the recharging operation, the extended prongs 24 and 25 stradle the terminal 16 of the battery so as to effectively shield the terminal from inadvertent contact by the user. Thus, the battery device 10 provides a further safety feature in the use thereof in the recharging operation.

The foregoing disclosure of specific embodiments is illustrative of the broad inventive concepts comprehended by the invention.

I claim:

1. In a rechargeable battery having cell means for storage of electrical energy, housing means enclosing said cell means, rectifier means within said housing means, and a pair of output terminals exposed to outwardly of said housing for delivering electrical energy from said cell means, the improvement comprising:
   a pair of prongs arranged for electrical connection to a female power supply receptacle;
   means for movably mounting said prongs at opposite sides of one of said terminals to extend selectively in a first disposition straddling one end of said housing and a second disposition projecting from said one end in parallel spaced relationship to be received in said female power receptacle with said one terminal effectively shielded from inadvertent contact by said housing and projecting prongs; and
   circuit means selectively interconnecting said cell means, rectifier means, terminals, and prongs including switch means for electrically connecting said prongs to said rectifier means and cell means to permit recharging of said cell means from the female power supply receptacle only when said prongs are disposed in said second disposition.

2. The rechargeable battery of claim 1 wherein said switch means comprises first contact means carried by the housing and connected to said circuit means, and second contact means electrically connected to said prongs for current conductive engagement with said first contact means when said prongs are in said second disposition.

3. The rechargeable battery of claim 1 wherein said means for movably mounting each said prong comprises a pivot member having a boss selectively receivable in either of a pair of recesses in said housing means and spring means are provided for biasing said boss selectively into the selected recess, said boss and recesses being arranged to releasably retain the prong selectively in either of said first and second dispositions.

4. The rechargeable battery of claim 1 wherein said mounting means comprises pivotal mounting means.

5. The rechargeable battery of claim 1 wherein said switch means comprises first spring contact means carried by the housing and connected to said circuit means, and second contact means electrically connected to said prongs for current conductive engagement with said first contact means when said prongs are in said second disposition.

6. The rechargeable battery of Claim 1 wherein said switch means comprises first contact means carried by the housing and connected to said circuit means, and second contact means electrically connected to said prongs for current conductive engagement with said first contact means when said prongs are in said second disposition.

7. The rechargeable battery of claim 1 wherein said switch means comprises first contact means carried by the housing and connected to said circuit means, and second contact means electrically connected to said prongs for current conductive engagement with said first contact means when said prongs are in said second disposition, said second contact means comprising leaf spring contacts.

8. The rechargeable battery of claim 1 wherein said switch means comprises first contact means carried by the housing and connected to said circuit means, and second contact means electrically connected to said prongs for current conductive engagement with said first contact means when said prongs are in said second disposition, said means for mounting said prongs to said battery comprising pivot means.

9. The rechargeable battery of claim 1 wherein said switch means comprises first contact means carried by the housing and connected to said circuit means, and second contact means electrically connected to said prongs for current conductive engagement with said first contact means when said prongs are in said second disposition, said means for mounting said prongs to said battery comprising pivot means pivotally mounting said prongs to said housing.

10. The rechargeable battery of claim 1 wherein said switch means comprises first contact means carried by the housing and connected to said circuit means, and second contact means electrically connected to said prongs for current conductive engagement with said first contact means when said prongs are in said second disposition, said first contact means comprising a portion of said prongs.

11. The rechargeable battery of claim 1 including shoulder means for limiting the movement of said prongs accurately to said extended disposition for facilitated alignment with said female power supply receptacle.

12. The rechargeable battery of claim 1 wherein said switch means comprises first contact means carried by the housing and connected to said circuit means, and second contact means electrically connected to said prongs for current conductive engagement with said first contact means when said prongs are in said second disposition, said first contact means comprising means movable with said prongs.

* * * * *